United States Patent
Mao et al.

(10) Patent No.: US 6,426,151 B1
(45) Date of Patent: Jul. 30, 2002

(54) WATER BORNE PRESSURE SENSITIVE ADHESIVE COMPOSITIONS DERIVED FROM COPOLYMERS OF HIGHER VINYL ESTERS

(75) Inventors: Chung-Ling Mao; Kenneth Merle Kem, both of Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/243,776

(22) Filed: Feb. 3, 1999

Related U.S. Application Data

(62) Division of application No. 08/748,216, filed on Nov. 12, 1996, now Pat. No. 6,084,024.

(51) Int. Cl.$^7$ .............................................. B32B 27/08
(52) U.S. Cl. ...................... 428/520; 156/60; 156/278; 156/280; 156/306.3; 156/327; 427/207.1; 427/316; 427/393.5
(58) Field of Search ....................... 428/520; 427/207.1, 427/316, 393.5; 156/60, 278, 306.3, 327, 280

(56) References Cited

U.S. PATENT DOCUMENTS

| | | | |
|---|---|---|---|
| 3,294,727 A | 12/1966 | Grommers et al. | 260/29.6 |
| 3,562,229 A | 2/1971 | Bauer et al. | 260/80.81 |
| 3,654,213 A | 4/1972 | Christenson et al. | 260/33.6 |
| 3,669,942 A | 6/1972 | Van Westrenen | 260/78.5 R |
| 3,697,618 A | 10/1972 | Grunewalder et al. | 260/78.5 R |
| 4,094,849 A | 6/1978 | Oyamada et al. | 260/29.6 MO |
| 4,115,306 A | 9/1978 | Lindemann et al. | 260/17 A |
| 4,130,526 A | 12/1978 | Nakayama et al. | 260/29.6 RB |
| 4,288,499 A | 9/1981 | Keilbania, Jr. | 428/518 |
| 4,322,516 A | 3/1982 | Wiest et al. | 526/307 |
| 4,395,499 A | 7/1983 | Rosenski et al. | 523/206 |
| 4,397,968 A | 8/1983 | Eck et al. | 523/305 |
| 4,532,295 A | 7/1985 | Brabetz et al. | 524/827 |
| 4,542,184 A | 9/1985 | Eck et al. | 524/827 |
| 4,647,504 A | 3/1987 | Kimimura et al. | 428/327 |
| 4,753,846 A | 6/1988 | Mudge | 428/343 |
| 4,822,676 A | 4/1989 | Mudge | 428/343 |
| 4,923,919 A | 5/1990 | Frazee | 524/460 |
| 4,939,190 A | 7/1990 | Tomioka et al. | 523/206 |
| 4,961,993 A | 10/1990 | Mudge | 428/343 |
| 4,963,422 A | 10/1990 | Katz et al. | 428/90 |
| RE34,093 E | 10/1992 | Powell et al. | 524/228 |
| 5,276,084 A | 1/1994 | Cheng et al. | 524/555 |
| 5,300,554 A | 4/1994 | Krell et al. | 524/547 |
| 5,461,103 A | 10/1995 | Bafford et al. | 524/460 |
| 5,480,720 A | 1/1996 | Eisenhart et al. | 428/414 |
| 5,514,435 A | 5/1996 | Suzuki et al. | 428/40 |

FOREIGN PATENT DOCUMENTS

| | | |
|---|---|---|
| WO | WO94/14891 | 7/1994 |

OTHER PUBLICATIONS

Chemical Abstracts 101:24687j Pressure–Sensitive Adhesive Composition, Kanzaki Paper Mfg. Co. Ltd.

*Primary Examiner*—Judy M. Reddick
(74) *Attorney, Agent, or Firm*—Mary E. Bongiorno; Russell L. Brewer

(57) ABSTRACT

The present invention is directed to improved flexibilized, plasticized polyvinyl chloride films bonded with a substrate by means of an aqueous based pressure sensitive acrylic adhesive emulsion polymers. Conventional emulsion based pressure sensitive adhesives were comprised of a copolymer comprised of polymerized units of acrylic esters and ethylenically unsaturated monomers, the copolymer having a $T_g$ of from −15 to −70° C. The improvement in the aqueous based, emulsion polymerized pressure sensitive adhesives resides in the incorporation of polymerized units of a vinyl $C_{8-13}$ ester of a neo-acid into the adhesive. The vinyl ester is formed from a mixture of propylene oligomers and such vinyl ester is represented by the chemical formula: $C_{8-13}H_{7-27}CO_2CH=CH_2$. Preferably, the adhesive includes units of methyl methacrylate, butyl acrylate of 2-ethylhexyl acrylate and a carboxylic acid selected from acrylic acid or methacrylic acid.

16 Claims, No Drawings

WATER BORNE PRESSURE SENSITIVE ADHESIVE COMPOSITIONS DERIVED FROM COPOLYMERS OF HIGHER VINYL ESTERS

CROSS-REFERENCE TO RELATED APPLICATIONS

This application is a division of U.S. Ser. No. 08/748,216 having a filing date of Nov. 12, 1996, now U.S. Pat. No. 6,084,024

BACKGROUND OF THE INVENTION

This invention relates to improved aqueous based pressure sensitive adhesive emulsions, the improvement residing in the incorporation of polymerized units of a vinyl ester of a neo-acid into the copolymer present in these emulsions.

Pressure sensitive adhesives are widely used for fabricating paper labels, laminating polymeric films such as laminating poly(vinyl chloride), polyester, etc., for forming decals and other related products. Most of the pressure sensitive adhesives have been solvent based but in recent year government regulations have forced the industry to develop environmentally friendly aqueous based pressure sensitive adhesives.

Aqueous based pressure sensitive adhesives comprised of polymerized monomer units of vinyl acetate, ethylene, and/or acrylic esters, etc. have been inferior to the solvent based pressure sensitive adhesives in that they do not have sufficient adhesive power to low surface energy substrates nor do they have good water resistance and so forth.

The following patents describe a variety of emulsion polymers incorporating vinyl esters and/or emulsion based pressure sensitive adhesives:

U.S. Pat. No. 5,461,103 discloses aqueous based pressure sensitive adhesive emulsions having an ability to coat low energy surfaces without retracting or cratering. The emulsion polymers are prepared by a two stage emulsion polymerization process, the first stage resulting in the formation of an alkali insoluble polymeric system incorporating acid functional groups and polymerized hydrophobic monomer units, e.g., $C_{4-12}$ alkyl acrylates and the second stage incorporating monomer units suited for the manufacture of pressure sensitive adhesives, e.g., acrylic and methacrylic esters, vinyl esters of $C_{2-5}$ carboxylic acids, e.g., vinyl acetate and vinyl propionate and the like.

U.S. Pat. No. 4,923,919 discloses pressure sensitive adhesive emulsions based on acrylic polymers that contain at least 40% by weight of an alkyl acrylate and a support resin that is alkali soluble. The support resin contains polymerizable carboxylic acid anhydride groups with the polymeric resin having a umber average molecular weight of from 1000–15,000. Typically the support resins are based on vinyl monomers such as acrylic and methacrylic acid esters, styrene and combinations thereof.

U.S. Pat. No. 4,322,516 discloses aqueous based pressure sensitive adhesives formed from ethylene units, acrylic ester units, vinyl acetate units, acrylamide units and other olefinically unsaturated monomers. Tackifying agents are incorporated into the ethylene based pressure sensitive adhesives.

U.S. Pat. No. 4,939,190 discloses emulsion type pressure sensitive adhesives wherein the emulsions are prepared in a staged procedure, the first stage comprising polymerizing an ethylenically unsaturated monomer such as styrene, acrylonitrile and/or (meth)acrylates in the presence of a tackifier resin and a second stage comprising polymerizing alkyl acrylates having at least 4 carbon atoms in the presence of the first stage polymer.

U.S. Pat. No. 5,276,084 discloses aqueous based pressure sensitive adhesives based on polymers comprising vinyl acetate, ethylene, alkyl acrylates dialkyl maleate and fumarates, hydroxyalkyl acrylates, acrylamides and unsaturated carboxylic acids such as acrylic acid.

U.S. Pat. No. 3,697,618 discloses acrylic pressure sensitive adhesives incorporating a vinyl ester of a carboxylic acid, e.g., vinyl acetate, a lower alkyl acrylate and a copolymerizable alpha, beta-ethylenically unsaturated dicarboxylic acid or anhydride.

U.S. Pat. No. 3,562,229 discloses solvent polymerized copolymers of ethylene and vinyl esters where the vinyl esters are derived from long chain carboxylic acids, e.g., versatic acid which are mixtures of $C_{9-11}$ carboxylic acids. Isotridecanoic and isononanoic are representative acids. The solvent based polymers incorporating vinyl esters of versatic acid were alleged to be superior to polymers incorporating vinyl laurate which has the same number of carbon atoms.

U.S. Pat. No. 3,294,727 discloses polymerizing vinyl esters of saturated monocarboxylic acids to form emulsions having suitability for producing freeze-thaw stable paints. The preferred saturated aliphatic monocarboxylic acids for forming vinyl esters are based upon compounds of the formula:

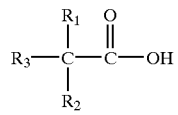

wherein $R_1$ and $R_2$ are alkyl radicals of normal, branched, or cyclic structure and $R_3$ represents a hydrogen or hydrocarbyl radical. The carboxylic acids have from about 9–19 carbon atoms. Representative copolymers are comprised of polymerized units of vinyl acetate and/or acrylic acid and the representative vinyl esters.

U.S. Pat. No. 3,669,942 discloses solvent based polymers comprising a vinyl ester of an alpha-branched, saturated aliphatic monocarboxylic acid having from 5–20 carbon atoms and an alpha, beta-ethylenically unsaturated carboxylic acid having 3–5 carbon atoms, a monovinyl aromatic compound and acrylic acid esters including hydroxyalkyl acrylate esters. The compositions are useful as water thinnable paint binders.

U.S. Pat. No. 3,654,213 discloses tacky pressure sensitive adhesives based on interpolymers of vinyl esters and alkyl acrylates, the interpolymers being dissolved at high solids content in organic solvents. Representative interpolymers are based upon vinyl acetate, vinyl propionate, vinyl butyrate, and vinyl valerate with vinyl acetate being preferred. Other monomers which can be incorporated into the polymer include acrylic acid esters such as methyl acrylate, ethyl acrylate and so forth.

U.S. Pat. No. 4,322,516 discloses pressure sensitive adhesive emulsions whose copolymers comprise:

(a) 10–30 wt % ethylene,
(b) 29–69 wt % acrylic aciesters of alcohols,
(c) 20–55 wt % vinyl acetate,
(d) 0.2–8 wt % (meth)acrylamide, and
(e) 0–12 wt % other olefinically unsaturated comonomers.

BRIEF SUMMARY OF THE INVENTION

The present invention is directed to improved aqueous based pressure sensitive adhesive emulsion polymers. Conventional aqueous emulsion based pressure sensitive adhesives are comprised of a copolymer comprised of polymerized units of acrylic esters and ethylenically unsaturated monomers, the copolymer having a $T_g$ of from −15 to −70° C. The improvement in the aqueous based, emulsion polymerized pressure sensitive adhesives resides in the incorporation of a vinyl ester of a $C_{8-13}$ neo-acid into the copolymers present in the pressure sensitive adhesives. Such copolymers incorporate a vinyl ester formed from a mixture of propylene oligomers and such vinyl ester is represented by the chemical formula:

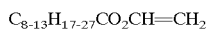

$$C_{8-13}H_{17-27}CO_2CH=CH_2$$

There are significant advantages associated with the above aqueous based pressure sensitive adhesive emulsions and the process for producing these emulsions and these advantages include:

- an ability to provide enhanced properties to pressure sensitive adhesives through the methyl group rich vinyl aster mixture which exhibits a lower solubility parameter compared to t he corresponding linear alkyl vinyl esters;
- an ability to provide enhanced properties to pressure sensitive adhesives through the ability of the vinyl ester monomer to undergo emulsion polymerization with a variety of olefincally unsaturated comonomers;
- an ability to form an excellent bond and enhanced resistance to plasticizer migration with plasticized poly (vinyl chloride);
- an ability to generate a class of pressure sensitive adhesives which have an excellent balance of peel and cohesive strength;
- an ability to provide enhanced thermal and hydrolytic stability to emulsion based pressure sensitive adhesives is compared to aqueous based vinyl acetate counterparts; and,
- an ability to provide enhanced properties to pressure sensitive adhesives through binding to lower surface energy surfaces of lower polarity, such as polyethylene, by virtue of stronger bonding of the copolymers

DETAILED DESCRIPTION OF THE INVENTION

Emulsion polymerization of ethylenically unsaturated monomers such as lower alkyl acrylates and vinyl esters, typically represented by vinyl acetate or vinyl propionate, to produce aqueous based pressure sensitive adhesive emulsions containing vinyl copolymer is well known. The improvement to emulsion based pressure sensitive adhesives containing vinyl copolymer incorporating polymerized units of ethylenically unsaturated monomer units resides in the incorporation of a vinyl ester of a neo-acid derived from a propylene oligomer feedstock into the vinyl copolymer.

The vinyl ester of a neo-acid of propylene oligomers or mixture thereof is incorporated into the vinyl polymer is comprised of the vinyl ester of a single or mixture of tri- and tetramers of propylene which have been converted to the corresponding single or mixture of $C_{8-13}$ neo-acids. These esters typically are prepared by first converting the tri and tetramers of propylene to the corresponding acids and then converting the corresponding those neo-acids to the vinyl esters. The vinylation of those acids can be achieved either by transvinylation with vinyl acetate or by catalytic addition of the neo-acids to acetylene. Some of the vinyl esters may be represented by a singular neo-acid, but generally the vinyl esters of the neo-acids are present as a mixture.

Aqueous based pressure sensitive adhesive emulsions are based on emulsions which comprise a colloidal dispersion of the vinyl copolymer in water. The copolymers present in the pressure sensitive adhesives are typically derived from the following monomers and within the percentage proportions listed below:

(a) 5–40 wt % of a vinyl ester of a $C_{8-13}$ neo-acid, preferably 15 to 30 wt %;

(b) 30–80 wt % of a $C_{1-12}$ alkyl ester of acrylic or methacrylic acid, preferably 40 to 70 wt %, (c) 0–20 wt % of a vinyl ester of saturated aliphatic acids, preferably 0 to 10%;

(d) 0–30 wt % ethylene, styrene or butadiene, preferably 0 to 20 wt %;

(e) 0–20 wt % di-($C_{1-3}$)alkyl maleate/fumarate, preferably 0 to 10 wt %;

(f) 0–5 wt % of a hydroxyalkyl (meth)acrylate;

(g) 0–5 wt % (meth)acrylamide; and, (h) 0–10 wt % alpha, beta-ethylenically unsaturated monocarboxylic acid.

A variety of other comonomers, eg., other ethylenically unsaturated monomers sometimes employed in the formation of the aqueous based pressure sensitive emulsions can be copolymerized with the vinyl ester of a neo-acid to form adhesives. For example, $C_{1-18}$ alkyl vinyl ethers, vinyl chloride, vinylidene chloride, nitriles, carboxylic amides such as N-vinylformamide and N-vinylacetamide, acrylonitrile and methacrylonitrile to produce a variety of polymers. Examples of useful alkyl vinyl ethers are methyl vinyl ether, ethyl vinyl ether, isopropyl vinyl ether, n-propyl vinyl ether, tert-butyl vinyl ether and n- and isobutyl vinyl ether.

Component (a) monomers which are the vinyl esters of $C_{8-13}$ neo-acids and utilized in producing the improved pressure sensitive adhesives have been defined.

Component (b) monomers utilized in producing the pressure sensitive adhesives containing the vinyl esters of $C_{8-13}$ neo-acids are alkyl esters of acrylic or methacrylic acid. These are esters of acrylic acid or methacrylic acid and a $C_{1-12}$ alcohol. Examples of suitable alcohols for the preparation of the esters are methanol, ethanol, propanol, isopropanol, n-, iso- and tert-butyl alcohol, neopentyl alcohol, 2-ethyl-hexanol, n-octanol, dodecanol, palmityl alcohol and stearyl alcohol. Specific examples of unsaturated alkyl acrylate monomers include methyl methacylate, ethyl acrylate, butyl acrylate, hexyl acrylate 2-ethylhexyl acrylate, isooctyl acrylate, isodecyl acrylate and the like.

Component (c) monomers which may be used in forming emulsion polymers for pressure sensitive adhesives can include other vinyl esters than the vinyl esters of neo-acids. Some of the more common vinyl esters used in the polymer synthesis include $C_{3-18}$ alkanoic acids, such as vinyl acetate, vinyl propionate, vinyl butyrate, vinyl laurate and the like. These esters, and particularly the lower alkyl esters, may detract from the overall properties of the pressure sensitive emulsion imparted by the vinyl ester of the $C_{8-13}$neo-acids.

Component (d) monomers used as fraction of the polymers utilized in forming emulsion polymers for pressure sensitive adhesives can include hydrocarbon monomers such as ethylene, styrene, butadiene.

Component (e) monomers used in forming many of the pressure sensitive adhesives include an alkyl maleate or fumarate, for the purpose of providing enhanced tack. etc. One may suitably use the diesters of maleic acid or fumaric acid, the diester being formed by the reaction of the acid with a $C_{1-13}$, such as, n-octyl alcohol, isooctyl alcohol, butyl alcohol, isobutyl alcohol, methyl alcohol, amyl alcohol and the like. Preferably a $C_{4-8}$, alcohol is employed.

Components (f) monomers often ere incorporated into the pressure sensitive adhesive polymer. Representative monomers include hydroxyethyl acrylate, hydroxyethyl methacrylate, hydroxypropyl acrylates, hydroxypropyl methacrylate, hydroxypropyl acrylates, hydroxypropyl methacrylates, hydroxybutyl acrylates and hydroxybutyl methacrylates.

Component (g) monomers often are incorporated into the copolymers at some levels. Examples of amides include acrylamide, methacrylamide and N-methylol-acrylamide.

Component (h) monomers include the alpha, beta-ethylenically unsaturated $C_{3-18}$ carboxylic acids which can be incorporate into the polymer can be methacrylic acid, crotonic acid, acrylic acid and the like.

The sum of the monomers used to form the pressure sensitive copolymers is 100 percent. The emulsion copolymers are designed to have a $T_g$ of less than $-15°$ C., preferably $-15$ to $-70°$ C. and typically $-20$ to $-50°$ C. The aqueous emulsions contain about 40 to 70 wt % solids.

The emulsion polymerization process typically involves an initial homogenization in which the monomers which include the vinyl esters of neo-acids and the other monomers which are employed to form the vinyl copolymer such as $C_{1-12}$ alkyl acrylates or methacrylates, vinyl acetate, dialkyl maleate/fumarate, ethylene, acrylamide and other monomers are thoroughly agitated. If ethylene is added to the reactor to form a copolymer, the reactor is pressured to the working pressure to effect solution of the ethylene in the monomers. Then, the reaction medium is gradually heated to polymerization temperature. The homogenization period is followed by a polymerization period during which the free radical source is added incrementally.

Various free-radical forming catalysts such as peroxide compounds can be used in carrying out the emulsion polymerization of the monomers. Combination-type catalysts employing both reducing agents and oxidizing agents can also be used. The use of this type of combined catalyst is generally referred to in the art as "redox polymerization" or "redox system." The reducing agent is also often referred to as an activator and the oxidizing agent as an initiator. Suitable reducing agents or activators include bisulfites, sulfoxylates, or other compounds having reducing properties such as ferrous salts, and tertiary aromatic amines, e.g., N,N-dimethylaniline. The oxidizing agents or initiators include hydrogen peroxide, organic peroxides such as benzoyl peroxide, t-butyl hydroperoxide and the like, persulfates, such as ammonium or potassium persulfate, perborates, and the like. A specific combination-type catalyst or redox system which can be used is hydrogen peroxide and sodium formaldehyde sulfoxylate.

The initiator is employed in the amount of 0.1 to 2%, preferably 0.25 to 0.75%, based on the weight of monomers introduced into the reactor. The activator is ordinarily added as an aqueous solution and the amount of activator is generally from 0.25 to 1 times the amount of initiator.

A wide variety of nonionic, anionic and cationic surfactants can be used to stabilize the emulsion in emulsion polymerization processes. Suitable nonionic emulsifying agents include polyoxyethylene condensates. Polyoxyethylene condensates may be represented by the general formula:

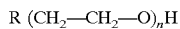

where R is the residue of a fatty alcohol containing 10–18 carbon atoms, an alkylphenol, a fatty acid containing from 10–18 carbon atoms, an amide, an amine, or a mercaptan, and where n is an integer of 1 or above. Some specific examples of polyoxyethylene condensates which can be used include polyoxyethylene aliphatic ethers such as polyoxyethylene lauryl ether, polyoxyethylene oleyl, ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thioethers such as polyoxyethylene n-dodecyl thioether. Other suitable nonionic surfactants are alkylarylethoxylate alcohols, alkylethoxylate alcohol, ethoxypropoxylate, alcohols from ethylene oxide and/or propylene oxide reaction products, and the like.

Another class of nonionic surfactants are sold under the Igepal trademark. One example within this class is a polyoxyethylene nonylphenyl ether having a cloud point of between 126 and 133° F. and marketed under the trade mark "Igepal CO-630"; another is polyoxyethylene nonylphenyl ether having a cloud point above 212° F. and marketed under the trade mark "Igepal CO-887."

Examples of anionic surfactants include metal or ammonium salts of long chain alkyl sulfates and the likes; metal or ammonium salts of alkylarylethoxylated sulfates or sulfonates, paraffin sulfonates, alkyl sulfosuccinates, alkylarylsulfonates, alkyl phosphates, etc.

A protective colloid also can be used in the polymerization mixture as a stabilizing agent. Various colloids and amounts conventionally used in emulsion polymerization can be incorporated into the latices as desired and in combination with the surfactants. Representative colloids which can be used include poly(vinyl alcohol), partially-acetylated poly(vinyl alcohol), e.g. up to 50% acetylated, casein, hydroxyethyl starch, carboxymethylcellulose, gum arabic, and the like.

The concentration range of the total amount of emulsifying agents used in emulsion polymerization is from 0.1 to 10% based on the aqueous phase of the latex regardless of the solids content. The stabilizers employed are, in part, governed by the use to which the copolymer latex is to be put. By utilizing appropriate levels of surfactant and/or protective colloid, one can obtain latex polymer particles having a variety of average particle size ranges and distributions.

In order to maintain the pH of the system at the desired value, there is suitably added a buffering agent of any convenient type. Any alkaline material which is compatible with the stabilizing agent can be used as the buffer. The amount of buffer is that sufficient to adjust the pH of the system within the desired range, e.g., 2.5 to 10 and preferably 3.5 and 8.5. The amount of buffer is generally about 0.1 to 0.5% by weight, based on the monomers.

Reaction temperatures for emulsion polymerizing the vinyl esters of neo-acids along with other monomers are conventional. The reaction temperature can be controlled by the rate of catalyst addition and by the rate of the heat dissipation therefrom. Generally, it is advantageous to maintain a temperature from about 50 to 90° C. While temperatures as low as 0° C. can be used, economically, the lower temperature limit is about 40° C.

The reaction time will also vary depending upon other variables such as the temperature, the catalyst, and the desired extent of the polymerization. It is generally desirable to continue the reaction until le s than 0.1%. of the vinyl ester remains unreacted. Under these circumstances, a reaction time of about 4 hours has been found to be generally sufficient for complete polymerization, but reaction times ranging from 2 to 10 hours have been used, and other reaction times can be employed, if desired.

The following examples are provided to illustrate various embodiments of the invention and are not intended to restrict the scope thereof.

EXAMPLE 1

Preparation of Water Borne Pressure Sensitive Adhesives of Mixed Vinyl Neo-$C_{8-13}$ Esters, 2-EHA Methyl Methacrylate and Acrylic Acid The mixed vinyl neo-$C_{8-13}$ esters employed in forming the pressure sensitive adhesive emulsions are formed from a propylene oligomer feedstock which is comprised predominately of propylene trimers and tetramers.

To a 2-liter resin reactor are added the following initial reaction mixture comprising 200 g of deionized water, 1.28 g of sodium citrate and 133 g of a pre-emulsion monomer mixture of the following composition:

| Deionized water | 288.90 g | |
|---|---|---|
| Abex EP-120 (30% active)* | 8.23 g | |
| Igepal CO-887 (70% active) | 8.23 g | |
| Aerosol MA-80 (80% active) | 7.20 g | |
| Vinyl neo-$C_{8-13}$ ester monomer | 144.00 g | 25.0%* |
| Methyl methacrylate | 74.90 g | 13.0%* |
| 2-Ethylhexyl acrylate | 345.60 g | 60.0%* |
| Acrylic acid | 11.52 g | 2.0% |

*Abex EP-120 is the ammonium salt of an alkylphenol ethoxylated sulfate,

The initial reaction mixture is heat d to 80° C. under nitrogen with 150–200 rpm agitation. A 4.5 g portion of a 5% aqueous solution of sodium persulfate is added over a period of 15 min to initiate the polymerization reaction. After initiation, the additions of both the pre-emulsion mixture delay-feed (6.2 g/min) and the persulfate initiator delay-feed (0.3 g/min), respectively, are begun. 755 g of the pre-emulsion mixture and 36 g of initiator solution are consumed over 150 min. An additional 5 g portion of the 5% sodium persulfate solution is added to complete the polymerization reaction to a residual monomer value less than 1000 ppm. The copolymerization temperature is maintained at 81–83° C. The resultant copolymer latex has 55% solids, a viscosity of 2,350 cps at 20 rpm (RVT #3 spindle), and a pH of 2.6, a $T_g$=–42° C. and the particle size number values, Dn=145 nm and particle size weight values, Dw=163 nm.

EXAMPLE 2

Preparation of Water Borne Pressure Sensitive Adhesives of Mixed Vinyl Neo-$C_{8-13}$ Esters, Butyl Acrylate, Methyl Methacrylate and Acrylic Acid The procedure of Example 1 was followed except for the substitution of butyl acrylate for the 2-ethylhexyl acrylate in the polymerization formulation. The resultant latex has 55% solids, a viscosity of 725 cps at 20 rpm (#3 spindle), a pH of 3.1 and a $T_g$ of –28° C.

EXAMPLE 3

Preparation of Water Borne Pressure Sensitive Adhesives of Vinyl Versatate, 2-EHA, Methyl Methacrylate and Acrylic Acid The procedure of Example 1 was followed except for the substitution of vinyl versatate (VeoVa 10), for the mixed vinyl neo-$C_{8-13}$ ester monomer in the polymerization formulation. The resultant VeoVa 10 ester based copolymer latex had 54.4% solids, a viscosity of 1250 cps at 20 rpm (RVT #3 spindle), a pH of 2.8 and a $T_g$ of –34° C.

EXAMPLE 4

Preparation of Water Borne Pressure Sensitive Adhesives of Vinyl Versatate, Butyl Acrylate, Methyl Methacrylate and Acrylic Acid The procedure of Example 3 was followed except for the substitution of butyl acrylate for 2-ethylhexyl acrylate in the polmerization recipe. The resultant latex has 55% solids, a viscosity of 2350 cps at 20 rpm (RVT #3 spindle), a pH of 2.6 and a $T_g$ of –24° C.

EXAMPLE 5

Preparation of Water Borne Pressure Sensitive Adhesives of Vinyl 2-Ethylhexanoate, 2-EHA, Methyl Methacrylate and Acrylic Acid The procedure of Example 1 was followed except for the substitution of vinyl 2-ethylhexanoate for the mixed neo-$C_{8-13}$ ester monomer in the polymerization recipe. The purpose was to determine the influence of the more linear ester on the resulting product vis-a-vis the mixed neo-$C_{8-13}$ ester monomer. The resultant copolymer latex has 51% solids, a viscosity of 475 cps at 20 rpm (RVT #3 spindle), a pH of 2.8 and a $T_g$ of –39° C.

EXAMPLE 6

Preparation of Water Borne Pressure Sensitive Adhesives of Mixed Vinyl Neo-$C_{8-13}$ Esters, 2-EHA, Ethylene, 2-hydroxypropyl Acrylate and Acrylic Acid To a high pressure one-gallon reactor is added a premix of the following ingredients:

| | |
|---|---|
| Deionized water | 720.1 g |
| Versulf S-1333* (40% active) | 21.3 g |
| Versulf NOS-25 (35% active) | 41.4 g |
| Sodium vinyl sulfonate (25% active) | 9.5 g |
| Acrylic acid | 14.2 g |
| Ammonium ferrous sulfate (1% active) | 1.7 g |

*Versulf S-1333 is from the sodium sulfosuccinate family.
*Versulf NOS-25 is from a sodium salt of a nonylphenol ethoxylate sulfate.

The pH of the premix is adjusted to 3.5 with 2.6 g of 14% aqueous ammonium hydroxide. A monomer mixture of:

580.3 g of vinyl neo-$C_{8-13}$ ester monomer and 177.7 g of 2-ethylhexyl acrylte is subsequently added to the reactor, followed by nitrogen and ethylene purge. The reactor is then blocked off and stirred at 200 rpm. When the reactor temperature reaches 50° C., ethylene is charged in and equilibrated to 840 psig for 5 min and shut off. The agitator speed is increased to 800 rpm. A separate feed of initiator and activator solutions are added at 0.4 ml/min. to initiate the polymerization reaction. The composition of the delay feeds are listed as follows:

| | Amount (g) |
|---|---|
| Initiator solution: | |
| Ammonium persulfate | 15.0 |
| NH$_4$OH (28%) | 9.0 |
| Deionized water | 190.0 |
| Activator solution | |
| Sodium formaldehyde sulfoxylate | 7.5 |
| Deionized water | 200.0 |
| Monomer mixture | |
| 2-Ethylhexyl acrylate | 656.1 |
| Acrylic acid | 22.5 |
| 2-Hydroxypropyl acrylate | 77.0 |
| Surfactant/emulsifier feed | |
| Versulf NOS-25% 35% active) | 360 |
| Deionized water | 110 |

After the initiation, the monomer an surfactant delay feeds are started at a rate of 3.2 ml/min and 0.8 ml/min respectively. After 2.5 hr, the monomer delay feed is reduced to 2.4 ml/min and the surfactant feed is reduced to 0.6 ml/min. After four hr, a total of 755 g of monomer and 175 ml of surfactant are added. The initiator and activator delay solutions are continued until the residual monomer value is at or less than 1000 ppm. At the end of initiator and activator delay, the reaction mixture is cooled to 30° C. and is then transferred to the degasser to release excess ethylene pressure. The resultant latex has 50% solids, a pH of 4.2, a viscosity of 94 cps at 20 rpm, a $T_g$ of −49° C. and particle size values of Dn=176 nm and Dw=287 nm.

EXAMPLE 7

Preparation of Water Borne Pressure Sensitive Adhesives of Mixed Vinyl Neo-C$_{8-13}$ Esters, Butyl Acrylate, Ethylene, 2-hydroxypropyl Acrylate and Acrylic Acid The procedure of Example 6 was followed except for the substitution of butyl acrylate for 2-ethylhexyl acrylate in the polymerization recipe. The resultant copolymer. latex has 46% solids, a viscosity of 114 cps at 20 rpm (RVT #3 spindle), a pH of 4.4 and a $T_g$ of −43° C.

EXAMPLE 8

Preparation of Water Borne Pressure Sensitive Adhesives of Mixed Vinyl Neo-C$_{8-13}$ Esters, 2-EHA, Ethylene, Vinyl Acetate, Methyl Methacrylate and Acrylic Acid To a 2-liter resin reactor, equipped with an agitator, condenser and external thermal controls are added the following initial reaction mixture comprising 320 g of deionized water, 1.6 g of sodium citrate an 166.4 g of a pre-emulsion mixture of the following composition:

| | | Wt % |
|---|---|---|
| Deionized water | 360.0 g | |
| Abex EP-120 (30% active), | 10.29 g | |
| Igepal CO-887 (70% active) | 10.29 g | |
| Aerosol MA-80 (80% active) | 9.0 g | |

-continued

| | | Wt % |
|---|---|---|
| vinyl acetate | 36.0 g | 5% |
| vinyl neo-C$_{8-13}$ monomer | 144.0 g | 20% |
| methyl methacrylate | 93.6 g | 13% |
| 2-ethylhexyl acrylate | 432.0 g | 60% |
| acrylic acid | 14.4 g | 2% |

The initial reaction mixture is heated to 80° C. under nitrogen atmosphere with agitation of 150–200 rpm. The polymerization reaction is initiated by addition of 3.4 g of a 5% sodium persulfate solution over a period of 14 minutes. After initiation, both the pre-emulsion delay feed (6.2 g/min) and the initiator feed (0.3 g/min), respectively are begun. At the end of 150 minutes, a total of 926 g of pre-emulsion mixture and 45 g of the 5% sodium persulfate are consumed. Additional 3 g of the sodium persulfate solution is added to reduce the residual monomer below the value of 1,000 ppm determined by GC, The polymerization temperature is maintained at 80–83° C. The resultant copolymer latex has a solids of 49%, a viscosity of 160 cps at 20 rpm (RVT #2 spindle), and a pH of 3.5, a $T_g$−37° C. and particle size values of Dn=157 nm and Dw=169 nm.

EXAMPLE 9

Performance Evaluation of Pressure Sensitive Adhesive on Polyester

The emulsions of Examples 1–8, when coated onto 50 μm polyester film (Mylar) at a dry weight of 22–24 g/m$^2$, after drying for 5 min at 110° C., gives the pressure sensitive adhesive properties (peel, tack and shear) measured by the following Pressure Sensitive Tape Council (PSTC) methods: The results are reported in Table 1.

Pressure Sensitive Tape Council (PSTC) Methods

180° angle peel adhesion is measured, after 20 minute dwell time, for a 25.4 mm wide strip on stainless steel at 23° C. and 50% relative humidity condition at a peel rate of 30.48 cm/min (12 in/min, PSTC-1).

Loop tack is measured by an instantaneous contact of a 25.4 mm wide loop perpendicular to a stainless steel test panel plane of 6.45 cm$^2$ (1 in$^2$) area.

Shear is measured in terms of time required to pull a standard area of tape from a stainless steel test panel under a standard load (PSTC-7).

TABLE 1

PSA Properties of Examples 1–8

| Example | Adhesion 180° Peel (g) | Loop tack (g) | Shear (hr) (1.61 cm$^2$ × 500 g loads) |
|---|---|---|---|
| 1 | 1271 | 953 | 25 |
| 2 | 1135 | 590 | 400+ |
| 3 | 1452 | 1090 | 19 |
| 4 | 1044 | 635 | 280+ |
| 5 | 1135 | 635 | 7.8 |
| 6 | 1180 | 817 | 2.5 |
| 7 | 1362 | 681 | 29 |
| 8 | 998 | 861 | 78 |

The results show that the higher $T_g$ material of Example 2 versus the lower $T_g$ material of Example 1 resulted in similar peel strength values but higher cohesive strength (shear) than the lower $T_g$ material. Loop tack was lower which is expected from adhesives having higher shear. The vinyl versatate system of Example 3 had the best peel strength while having good shear. Again, the higher $T_g$ of Example 4 had higher shear than the Example 3 product. Peel was noticeably effected but remained good relative to commercial systems. Example 5 shows the deleterious effect on cohesive strength when a higher, linear vinyl ester is substituted for the vinyl neo-$C_{8-13}$ esters. Pressure sensitive adhesives incorporating ethylene had significantly lower shear as would be expected because of the softness imparted by the ethylene. However, with regard to comparable ethylene based pressure sensitive adhesives, those values are good. Example 8 shows that replacing up to 5% of the vinyl neo-$C_{8-13}$ esters with a lower aliphatic vinyl ester, viz. vinyl acetate can a aversely affect peel and loop tack. Although shear is somewhat better in the vinyl acetate containing adhesive.

EXAMPLE 10

Performance Evaluation of Pressure Sensitive Adhesive on Plasticized PVC

The pressure sensitive adhesive constructions are prepared by coating the liquid dispersions on a siliconized release liner, dried and laminated onto the plasticized flexible PVC film with a coatweight of 27–29 g/m². The pressure sensitive performance properties for both the initial samples anti the thermally aged (70° C. for 7 days on siliconized liner) samples are presented in Table 2:

TABLE 2

| Emulsion | 180° Peel (g) Initial | | 180° Peel (g) | Loop | Shear (hr) (6.45 cm2 × |
|---|---|---|---|---|---|
| | 20 min Dwell | 24 hr Dwell | Thermal Aged On Liner | Tack (g) | 2 kg loads) |
| Example 1 | 2497 | 3133 | 2225 | 1226 | 46 |
| Example 2 | 2043 | 2633 | 999 | 953 | 292 |
| Example 3 | 2224 | 2769 | 1680 | 1544 | 81 |
| FL-1625* | 1571 | 2256 | 459 | 1166 | 9 |

*Flexbond 1625 emulsion is a commercial, water based, acrylic pressure sensitive adhesive.

The results show excellent peel and cohesive strength on plasticized PVC. An important feature is the 180° peel, thermal aged. The emulsions having vinyl polymers incorporating the $C_{8-13}$ vinyl esters of neo-acids of the formula $C_{8-13}H_{17-27}CO_2CH=CH_2$ resulted in substantially better adhesion and resistance to plasticizer migration in the PVC as compared to the commercial adhesive.

EXAMPLE 11

Comparable PSA Performance vs Commercial Products on Plasticized Flexible Poly(vinyl chloride) Film Similar to Example 10, pressure sensitive adhesive constructions were prepared by coating the liquid dispersion on a siliconized release liner, dried and laminated onto the plasticized flexible poly(vinyl chloride) film (FW 400 vinyl film) with a coat weight of 27 g/m². The pressure sensitive properties and the thermally aged (70° C. for 7 days on siliconized liner) for the Examples 1 and 4 adhesives, two water based commercial acrylic emulsions and one commercial solvent acrylic based pressure sensitive adhesive were determined and the results are presented in Table 3.

TABLE 3

| Product | Peel Adhesion Initial (g) | Peel Adhesion Thermal Aged (g) |
|---|---|---|
| Example 1 | 2315 | 1498 |
| Example 4 | 1998 | 1317 |
| Commercial Acrylic Emulsion 1 | 1498 | 272 |
| Commercial Acrylic Emulsion 2 | 1725 | 817 |
| Commercial solvent Acrylic based | 1998 | 999 |

The results show superior peel and thermal aged properties for the emulsion based pressure sensitive adhesives in PVC films incorporating the vinyl neo-$C_{8-13}$ esters of the formula $C_{8-13}H_{17-27}CO_2CH=CH_2$ as compared to commercial water based pressure sensitive adhesive emulsions and the commercial solvent based pressure sensitive adhesive.

What is claimed is:

1. In a process for forming a laminate comprised of a flexible plasticized polyvinyl chloride film bonded to a substrate by means of a water based, acrylic emulsion adhesive comprised of a copolymer having polymerized units of $C_{1-12}$ alkyl acrylates or $C_{1-12}$ alkyl methacrylates wherein said process comprises the steps of coating said water based acrylic emulsion onto the flexible plasticized polyvinyl chloride film or onto the substrate, drying the resulting film and then laminating the flexible plasticized polyvinyl chloride film to the substrate, the improvement for enhancing adhesion and resistance to plasticizer migration from the flexible plasticized polyvinyl chloride film which comprises:

utilizing a water based, acrylic emulsion adhesive which incorporates a copolymer comprising polymerized units of $C_{1-12}$ alkyl acrylates or $C_{1-12}$ alkyl methacrylates and polymerized units of a vinyl $C_{8-13}$ ester of a neo-acid obtained from a feedstock of propylene oligomers.

2. The process of claim 1 wherein the copolymer has a $T_g$ of from −20 to −50° C.

3. The process of claim 2 wherein the vinyl ester is represented by the chemical formula:

$$C_{8-13}H_{17-27}CO_2CH=CH_2.$$

4. The process of claim 2 wherein the copolymer is comprised of polymerized units of monomers (a) through (c) in the weight percentages of the total copolymer as set forth:

(a) 15–30 wt % of a vinyl ester of a neo-acid;

(b) 30–80 wt % of a $C_{1-12}$ alkyl acrylate or methacrylate, and (c) an alpha, beta-ethylenically unsaturated monocarboxylic acid in an amount up to 10 wt %.

5. The process of claim 2 wherein the copolymer comprises polymerized units of methyl methacylate.

6. The process of claim 5 wherein the copolymer further comprises polymerized units of butyl acrylate or 2-ethylhexyl acrylate.

7. The process of claim 6 wherein the copolymer further comprises polymerized units of hydroxypropyl acrylate.

8. The process of claim 6 wherein the copolymer further comprises polymerized units of acrylic or methacrylic acid.

9. The process of claim 4 wherein the copolymer consists essentially of polymerized units of a vinyl ester of a neo-acid, methyl methacrylate, a $C_{1-12}$ alkyl acrylate consisting essentially of 2-ethylhexyl acrylate or butyl acrylate, and acrylic or methacrylic acid.

10. In a laminate comprised of a flexible plasticized polyvinyl chloride and a substrate bonded together by means of a pressure sensitive, water based, acrylic emulsion adhesive, the improvement which comprises as said water based, acrylic emulsion adhesive, an adhesive which incorporates a copolymer comprised of polymerized units of the following monomers.

(a) 15–30 wt % of a vinyl ester of a neo-acid;

(b) 30–80 wt % of a $C_{1-12}$ alkyl ester of acrylic or methacrylic acid, and, (c) an alpha, beta-ethylenically unsaturated monocarboxylic acid in an amount up to 10 wt %.

11. The laminate of claim 10 wherein the copolymer has a $T_g$ of from −20 to −50° C.

12. The laminate of claim 11 wherein the vinyl ester is represented by the chemical formula:

$$C_{8-13}H_{17-27}CO_2CH=CH_2.$$

13. The laminate of claim 12 wherein the copolymer comprise polymerized units of methyl methacrylate.

14. The laminate of claim 13 wherein the $C_{1-12}$ alkyl ester of acrylic or methacrylic acid is selected from the group consisting of butyl acrylate and 2-ethylhexyl acrylate.

15. The laminate of claim 14 wherein the alpha, beta-ethylenically unsaturated monocarboxylic acid is acrylic or methacrylic acid.

16. The laminate of claim 15 wherein the water based, acrylic emulsion adhesive consists essentially of polymerized monomer units of: (a) a vinyl ester of a neo-acid, (b) methyl methacrylate, butyl acrylate or 2-ethylhexyl acrylate, and (c) acrylic or methacrylic acid.

* * * * *